United States Patent [19]
Kontz

[11] 3,737,267
[45] June 5, 1973

[54] SAFETY DEVICE FOR BLOW MOLDING MACHINE

[75] Inventor: Robert F. Kontz, Toledo, Ohio

[73] Assignee: Owens-Illinois, Inc., Toledo, Ohio

[22] Filed: Jan. 7, 1972

[21] Appl. No.: 216,214

[52] U.S. Cl. .................. 425/154, 74/519, 83/543, 425/DIG. 45
[51] Int. Cl. .............................................. B29h 5/24
[58] Field of Search ............... 425/151, 154, DIG. 45; 83/543; 74/519, 584

[56] References Cited

UNITED STATES PATENTS

| | | | |
|---|---|---|---|
| 68,882 | 9/1867 | Ives | 425/154 |
| 1,183,620 | 5/1916 | Biggert | 83/543 X |
| 2,410,708 | 11/1946 | Breither et al. | 74/519 UX |

*Primary Examiner*—H. A. Kilby, Jr.
*Attorney*—Philip M. Rice and E. J. Holler

[57] ABSTRACT

In the event of an obstruction which prevents the full stroke of a mechanically driven reciprocating mold in a blow molding machine, a pair of shear pins in the drive arm fail in a controlled sequence to completely disconnect the drive mechanism from the molds, thereby preventing damage to more costly elements.

5 Claims, 6 Drawing Figures

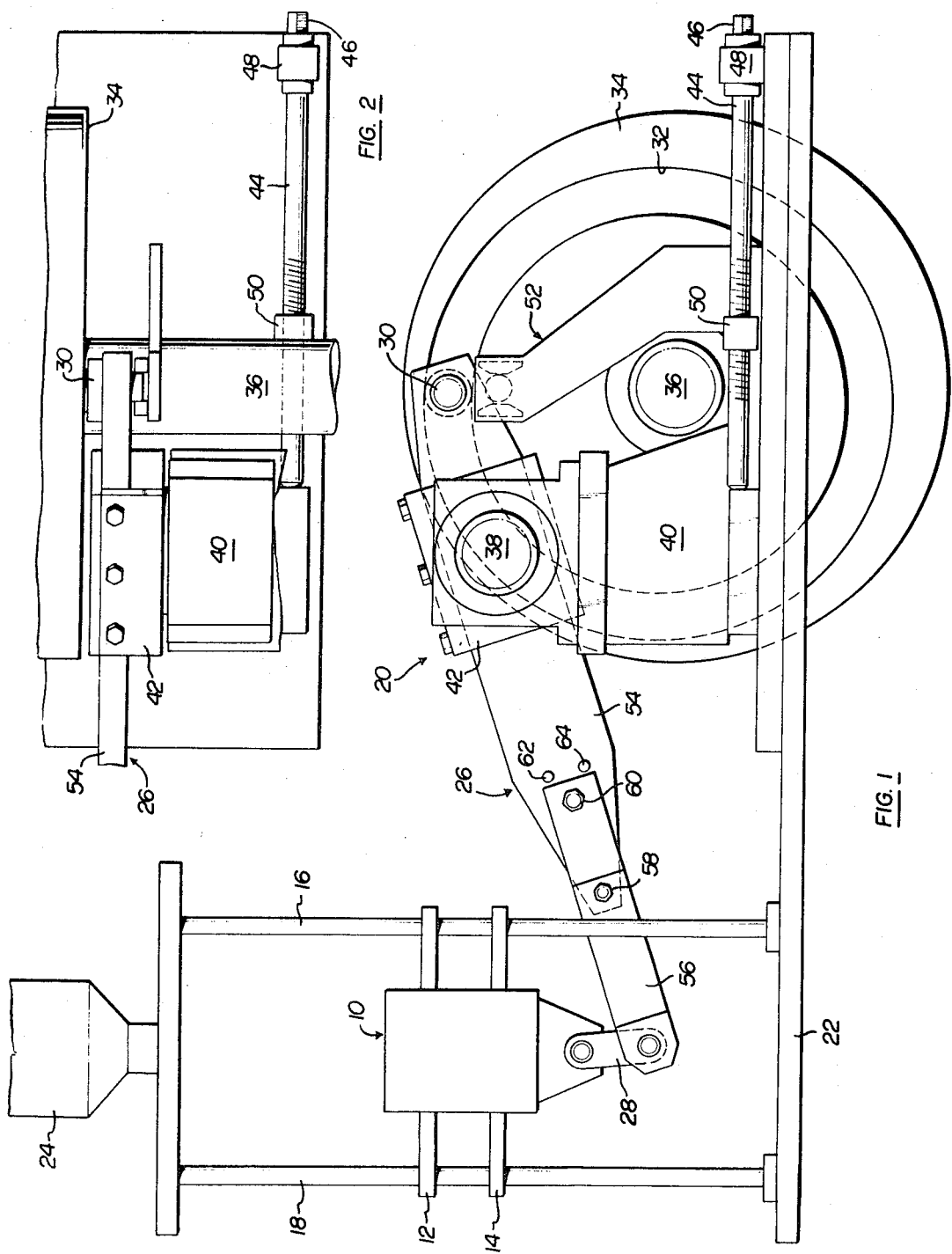

SAFETY DEVICE FOR BLOW MOLDING MACHINE

BACKGROUND OF INVENTION

In blow molding apparatus, such as is disclosed in copending commonly assigned application of Criss and Pollitt, Ser. No. 835,091, filed June 20, 1969, now U.S. Pat. No. 3,652,751 entitled "Method and Apparatus for Blow Molding Plastic Articles," the mold reciprocates vertically toward and away from an extruder at which the mold halves close about the parison and then move downwardly during the blowing operation while a second mold travels upwardly to similarly receive a portion of the parison. This vertical reciprocation of the mold assembly is produced by a positive mechanical drive mechanism.

In the event of a physical obstruction or other minor mechanical failure which blocks the vertical travel of the mold, serious and costly damage to the mold or other mechanism can occur.

Hence, it is the principal object of this invention to provide a means for disassembling the drive mechanism from the molds in the event that the molds are prevented from moving through their normal stroke.

BRIEF DESCRIPTION OF THE DRAWINGS

FIG. 1 is an elevation of the mold and mold drive mechanism.

FIG. 2 is a partial plan view of the mold drive mechanism of FIG. 1.

FIG. 3 is an elevation of the mold drive arm, as shown in FIG. 1.

FIG. 4 is a plan view of the arm of FIG. 3.

FIGS. 5 and 6 are fragmentary views of a portion of the mold drive arm of FIG. 3, showing two stages of the controlled failure thereof.

DETAILED DESCRIPTION OF THE INVENTION

Referring to FIG. 1 of the drawings, there is illustrated a mold assembly 10 mounted on supporting plates 12, 14 which slide upon a pair of vertical guide shafts 16 and 18 under the impetus of a drive mechanism generally illustrated at 20. The entire structure is mounted on a base 22.

Drive mechanism 20 causes mold assembly 10 to reciprocate vertically towards and away from an extruder 24, where the mold halves close about an extruded parison and then travel downwardly during the blowing operation. At the bottom of the stroke, the mold halves open and the blown article is ejected, and the cycle then repeats itself.

Drive mechanism 20 comprises a crank arm assembly 26 connected to mold assembly 10 by link 28. A roller follower 30 is mounted on the opposite end of crank arm assembly 26 and engages a groove 32 in a rotating drum cam 34 mounted on shaft 36.

Crank arm assembly 26 is slidably mounted and releasably clamped within a sleeve 42 which is pivotally mounted on shaft 38. Shaft 38 is rotatably secured to base 40 which is slidably mounted on base 22. This arrangement permits the length of the vertical stroke of mold assembly 10 to be adjusted when desired. To adjust the stroke length, sleeve 42 is loosened about crank arm assembly 26. Next, a threaded adjusting lead screw 44 having a conventional hexagonal head 46 is rotated within bearing 48 fixed to base 22 and within a threaded bore in boss 50 fixed to base 40, the latter serving as a nut for lead screw 44. Thus, rotation of lead screw 44 causes crank arm base 40 and pivot shaft 38 to slide left or right in FIG. 1, with crank arm assembly 26 sliding within loosened sleeve 42 during this process. It will be understood by those skilled in the art that shifting shaft 38 toward the left will shorten the stroke of mold assembly 10, while shifting it toward the right will lengthen the stroke. When the desired stroke has been obtained, sleeve 42 is again tightened to securely clamp crank arm assembly 26.

A crank arm stop assembly 52 fixed to base 22 limits the downward stroke of the follower end of crank arm assembly 26, thereby providing a safety feature which prevents overtravel of mold assembly 10 in the upward direction toward the extruder 24.

Referring now to FIGS. 3-6 in particular, crank arm assembly 26 comprises two arm segments, a follower arm 54 and a pair of symmetrically opposite arm extensions 56 interconnected by connecting bolts 58, 60. It will be observed from the figures that bolt 60 has a larger diameter than bolt 58, to provide greater shear strength for a purpose to be described below. A pair of pins 62, 64 pass through follower arm 54 closely adjacent to the right end of arm extensions 56. Pins 62, 64 are fabricated of a material and diameter selected to provide still greater shear strength than connecting bolt 60.

The controlled failure of crank arm assembly 26 will now be described. Assuming that crank arm assembly 26 is pivoting in the clockwise direction during the upward stroke of mold assembly 10, any obstruction to such stroke will induce a downward resistance force R on the left end of arm extension 56, as shown in FIGS. 5 and 6. Continued clockwise movement of follower arm 54 under the driving impetus of drum cam 34 will initially cause shear failure of connecting bolt 58, the weakest of the four elements 58, 60, 62 and 64. Once bolt 58 has failed, the two segments of crank arm assembly 26 are free to pivot relative to each other about bolt 60 until the right end of arm extensions 56 abut either pin 62 or 64. FIG. 5 illustrates the condition of crank arm assembly 26 after connecting bolt 58 has sheared off and after continued movement of follower arm 54 has brought the right edge of arm extensions 56 into abutment with pin 64.

At this stage of the sequence, an extremely high shear force is induced in connecting bolt 60 and shear pin 64. Those skilled in the art will understand that if moments are summed about bolt 60, the resistance force R operating at the relatively long lever arm to bolt 60 produces a moment which must be balanced by the larger reaction force of pin 64 against arm 56 operating at a relatively small lever arm from bolt 60. The large force at pin 64, in turn, must be balanced by a large shearing force provided by bolt 60.

This substantial multiplication of resistance force R is sufficient to cause shear failure of connecting bolt 60, bolt 60 failing rather than pin 64 because of the intentionally substantially increased shear strength of pins 62 and 64. When connecting bolt 60 fails, follower arm 54 is completely severed from arm extensions 56, as shown in FIG. 6. This break in the drive train immediately terminates the application of all driving forces to mold assembly 10, while permitting the drive mechanism to continue to operate until it can be shut off. By sacrificing two inexpensive bolts, costly damage to the molds or other portions of the machine is avoided.

In the event that the obstruction or resistance force R is directed upwardly rather than downwardly upon arm extensions 56, the slight relative pivotal movement between follower arm 54 and arm extensions 56 which initially occurs upon failure of connecting bolt 58 will cause arm extensions 56 to pivot into abutting contact with pin 62 rather than 64. Thereafter, the sequence of events in the controlled failure will be exactly as described above in relation to FIGS. 5 and 6, except that pin 62 rather than pin 64 provides the force-multiplying reaction required to cause failure of bolt 60.

This invention may be further developed within the scope of the following claims. Accordingly, the above specification is to be interpreted as illustrative of only a single operative embodiment of this invention, rather than in a strictly limited sense.

I now claim:

1. In a blow molding machine having a drive mechanism including a power driven arm connected to the mold for causing the mold to reciprocate toward and away from the extruding nozzle, safety means forming a portion of the drive arm for disconnecting the mold halves from the drive mechanism in the event of an obstruction to the stroke of the mold, comprising:

a normally fixed and non-pivoting connection between first and second longitudinally aligned but slightly overlapping segments of the power driven arm;

said connection comprising first and second longitudinally spaced pins passing transversely through said overlapping portion of both said first and second arm segments to normally establish a fixed and non-pivoting connection therebetween;

abutment means fixed to said first arm segment closely adjacent to but normally out of contact with said second arm segment;

said first pin being so constructed as to be less resistant to shear failure than said second pin, so that in the event of an obstruction to the stroke of the mole, a shear load is created upon both said first and second pins, which shear load will first cause said first pin to fail in shear, which failure permits said arm segments to pivot relative to each other about said second pin under the continued impetus of the drive mechanism, the relative movement between said segments bringing said second arm segment into contact with said abutment means on said first arm segment, said abutment means being of sufficient strength to resist failure and to provide a reaction force against said second arm segment which causes said second pin to fail in shear to completely sever all connections between said first and second arm segments.

2. The safety means of claim 1 wherein said second pin is located between said first pin and said abutment means.

3. The safety means of claim 1 wherein said abutment means comprises third and fourth transverse shear pins positioned so that one of said third and fourth pins will be engaged by said second arm segment after only a slight degree of relative movement of said arm segments following failure of said first pin.

4. In a blow molding machine having a drive mechanism including a power driven arm connected to the mold for causing the mold to reciprocate toward and away from the extruding nozzle, safety means forming a portion of the drive arm for disconnecting the mold halves from the drive mechanism in the event of an obstruction to the stroke of the mold, comprising:

a normally fixed and non-pivoting connection between first and second longitudinally aligned but slightly overlapping segments of the power driven arm;

said connection comprising first and second longitudinally spaced pins passing transversely through said overlapping portion of both said first and second arm segments to normally establish a fixed and non-pivoting connection therebetween;

third and fourth transverse shear pins mounted in said first arm segment and spaced slightly from said second arm segment;

said second pin being more resistant to shear failure than said first pin but less resistant to shear failure than either said third or said fourth pin;

whereby an obstruction to the stroke of the mold will load said first and second pins in shear, causing said first pin to fail in shear first to allow said first and second arm segments to pivot slightly about said second pin relative to each other under the continued impetus of the drive mechanism to bring an edge of said second arm segment into contact with one of said third and fourth shear pins, said one of said third and fourth shear pins providing a reaction which functions to further load said second pin in shear until said second pin fails, to completely disconnect said first and second arm segments from each other.

5. The safety means of claim 4 wherein said third and fourth shear pins are located substantially closer to said second pin than is the arm-mold connection.

* * * * *